United States Patent

Kinghorn et al.

[11] Patent Number: 4,698,677
[45] Date of Patent: Oct. 6, 1987

[54] TELEVISION RECEIVER ARRANGEMENTS

[75] Inventors: John R. Kinghorn, Sutton; Richard E. F. Bugg, Coulsdon, both of England

[73] Assignee: U.S. Philips Corporation, New York, N.Y.

[21] Appl. No.: 663,794

[22] Filed: Oct. 23, 1984

[30] Foreign Application Priority Data

Oct. 26, 1983 [GB] United Kingdom ............... 8328623

[51] Int. Cl.⁴ .......................................... H04N 7/093
[52] U.S. Cl. .................................... 358/147; 358/141; 358/142; 358/146; 340/735; 340/748; 340/790
[58] Field of Search ............... 358/141, 142, 146, 147; 340/706, 721, 735, 745, 747, 748, 790, 804

[56] References Cited

U.S. PATENT DOCUMENTS 4,429,306  1/1984  Macauley et al. ................. 340/735

OTHER PUBLICATIONS

"Broadcast Teletext Specification"; British Broadcasting Corporation, Independent Broadcasting Authority and British Radio Equipment Manufactures' Association; Sep. 1976; pp. 1-20.
"Alphabets for CEEFAX"; BBC Engineering; Dec. 1977; p. 2.
Nachrichtentechnische Zeitschrift, "Das Videotex-System Antiope", by P. H. Graf, Aug. 1980, vol. 33, No. 8, pp. 538-543.
Selektor "Enhanced Teletext Systems", elector Jun. 1981, pp. 6-01-6-04.

Primary Examiner—James J. Groody
Assistant Examiner—Michael D. Parker
Attorney, Agent, or Firm—Thomas A. Briody; William J. Streeter; Gregory P. Gadson

[57] ABSTRACT

A teletext television receiver has a character memory comprising a common language set of characters and a plurality of sets of national option characters, each of which latter sets makes up a complete national language set when combined with the common language set. The totality of characters are arranged for addressing in two different modes. In one addressing mode, only one of the national option sets can be selected for page display as determined by control bits contained in the page header, so that the page can be only in one language. In the other addressing mode, all the national option sets can be selected for page display as determined by ghost row information of an acquired page, or locally by the receiver. This allows a display page to be in more than one language. FIGS. 3 and 4 show the code tables for the two addressing modes.

5 Claims, 4 Drawing Figures

| | | | | | b8=1 | | | | | | | |
|---|---|---|---|---|---|---|---|---|---|---|---|---|
| | | | | | 8 | 9 | 10 | 11 | 12 | 13 | 14 | 15 |
| | | | | b7 | 0 | 0 | 0 | 0 | 1 | 1 | 1 | 1 |
| | | | | b6 | 0 | 0 | 1 | 1 | 0 | 0 | 1 | 1 |
| | | | | b5 | 0 | 1 | 0 | 1 | 0 | 1 | 0 | 1 |
| | b4 | b3 | b2 | b1 | | | | | | | | |
| 0 | 0 | 0 | 0 | 0 | @ | É | (SPACE) | 0 | § | P | ° | p |
| 1 | 0 | 0 | 0 | 1 | — | é | ! | 1 | A | Q | a | q |
| 2 | 0 | 0 | 1 | 0 | ¼ | ä | " | 2 | B | R | b | r |
| 3 | 0 | 0 | 1 | 1 | £ | # | # | 3 | C | S | c | s |
| 4 | 0 | 1 | 0 | 0 | $ | ¤ | $ | 4 | D | T | d | t |
| 5 | 0 | 1 | 0 | 1 | ≣ | ≣ | % | 5 | E | U | e | u |
| 6 | 0 | 1 | 1 | 0 | ▨ | ◐ | & | 6 | F | V | f | v |
| 7 | 0 | 1 | 1 | 1 | ? | ⬥ | ' | 7 | G | W | g | w |
| 8 | 1 | 0 | 0 | 0 | ‖ | ö | ( | 8 | H | X | h | x |
| 9 | 1 | 0 | 0 | 1 | ¾ | å | ) | 9 | I | Y | i | y |
| 10 | 1 | 0 | 1 | 0 | ÷ | ü | * | : | J | Z | j | z |
| 11 | 1 | 0 | 1 | 1 | ← | Ä | + | ; | K | Ä | k | ä |
| 12 | 1 | 1 | 0 | 0 | ½ | Ö | , | < | L | Ö | l | ö |
| 13 | 1 | 1 | 0 | 1 | → | Å | — | = | M | Ü | m | ü |
| 14 | 1 | 1 | 1 | 0 | ↑ | Ü | . | > | N | ^ | n | ß |
| 15 | 1 | 1 | 1 | 1 | # | _ | / | ? | O | _ | o | ■ |

128 Disp

TELEVISION RECEIVER ARRANGEMENTS

BACKGROUND OF THE INVENTION

1. Field of the Invention

This invention relates to television receiver arrangements of a kind suitable for use in a television transmission system of a character in which coded data pulses representing alpha-numeric text or other information are transmitted in a television signal in television lines where no picture signals representing normal picture information are present.

The possibility does exist, for a television transmission system of the above character, of so-called "full-channel" operation in which all of the television lines of each field are employed for transmitting coded data pulses. However, in existing television transmission systems of the above character, only television lines in the field-blanking intervals are employed for the transmission of the coded data pulses, so that such transmission is, in effect, multiplexed with the normal picture transmission. The alpha-numeric text or other information transmitted in this way can be displayed as a selectable alternative to the normal picture information by the use of a suitably adapted television receiver arrangement which can acquire the coded data pulses from the television signal. A television transmission system of the above character may be of the over-air broadcast type, or of the type which uses a cable as the transmission medium.

2. Description of the Related Art

A television transmission system of the above character is described in United Kingdom patent specification No. 1 370 535. Also, the publication "Broadcast Teletext Specification", September 1976, published jointly by the British Broadcasting Corporation, Independent Broadcasting Authority and British Radio Equipment Manufacturers' Association, gives details of a specification for a system of the above character.

In the above-identified Broadcast Teletext Specification, a quantity of message information to be displayed as an entity on a television screen is termed a page and will be so termed hereinafter. All of the pages which are available for display are transmitted in a recurrent cycle, with or without up-dating page information as appropriate. At the adapted television receiver arrangement a viewer can request any page for display, the requested page being acquired from the cyclic transmission the next time it occurs therein and stored in a display memory of the television receiver until replaced by a subsequently acquired page. A page consist of 24 display rows each having 40 character positions. The first display row (Row 0) of each page is termed a page-header and contains inter alia the page number. The transmission of each page begins with, and includes, its page-header and ends with, and excludes, the next page-header which is transmitted. Thus, it is assumed that all of the display rows which are transmitted between two successively transmitted page-headers belong to the page having the first page-header. The assumption avoids the need to include in each display row data for identifying the page to which the row belongs. However, because different groups of pages (magazines) use the same range of page numbers, so that more than one page can have the same page number, and because the pages from different magazines may have their display rows interleaved, each display row also includes data which identifies the magazine containing the page that the row belongs to.

The display rows are themselves identified by repective row numbers which are transmitted in the rows and which determine the row positions in the relevant page. This enables the rows of a page to be transmitted in any order, following the page-header for the page, and rows containing no information for display need not be transmitted. The row numbers are provided as respective 5-bit codes. Because only 24 of the 32 possible 5-bit code combinations are required for identifying the 24 display rows, it has been proposed that at least some of the 8 remaining 5-bit code combinations should be used to identify so-called "ghost" rows in each page. It is the intention that these ghost rows can be used to transmit auxiliary information which is not displayed but which is for processing by logic circuitry in the adapted television receiver arrangement to extend and/or enhance the facilities afforded by the system. Because the information contained in ghost rows is not displayed, it becomes possible to have more than one ghost row with the same row number, provided that each such row contains a sequencing bit or bits to distinguish it from another row or rows having the same row number. In principle, the total number of rows (display and ghost) which a page can contain is then limited by the maximum acceptable period that a viewer has to wait to acquire a requested page from the cyclic transmission of all the available pages.

Thus, in the present context, a display row is to be construed to mean a row containing information intended as part of the display of a page with which the display row is identified, and a ghost row is to be construed to mean a row containing information not intended as part of the display of a page with which the ghost row is identified, the information instead relating to that page in some other respect.

A television receiver arrangement of the above kind includes acquisition means for acquiring teletext information in digitally coded form, memory means for storing the acquired digital codes, and character generator means for producing from the stored digital codes, character generating video signals for the teletext display.

It is khown for the character generator means to include a character memory in which is stored character information identifying the available character shapes which the arrangement can display. The character information is selectively addressed in accordance with the stored digital codes and the information read-out is used to produce the character generating video signals for the teletext display.

The teletext transmissions in the United Kingdom are all in one language, namely English, and the character generator employed for these transmissions produces English language characters from the acquired digital codes. If such transmissions were provided in a country whose national language used additional characters to those of the English language, or characters which differ to English language characters, it would be a simple matter to provide for these transmissions a character generator having a character memory for the alphabet of the country concerned. Such a simple solution however does not fit the needs of a country which can receive teletext transmissions from neighbouring countries having languages whose alphabets differ from that of its national alphabet. Such a situation can be found at a number of places on the Continent of Europe where in addition to the basic Latin alphabet different countries employ different accented characters. One way of overcoming this problem and allowing reception of different teletext transmissions in different languages is proposd in B.B.C. Engineering, December 1977, page 2, in the article Alphabets for CEEFAX where it is suggested that a character generator could have a character memory providing different character sets which are for selection according to the language transmitted by using control bits on each page to select the correct character set for that page. The control bits which it is suggested could be used are three (C12, C13 and C14) contained in the Page-Header (Row 0) which are at present unallocated.

A study of the Centre Commun d' Etudes de Telecommunications et Television (C.C.E.T.T.) Report TSA/T/14/77, "Problems Linguistiques du Teletexte. Etudes des langues Europeennes utilisant l'alphabet Latin—Rapport final", Rennes, July 1977 reveals that the character requirements of all the major European languages can be met with a number of character sets having control and character codes according to International Standard ISO 646. These character sets differ only in the use of a few (11) national use character options.

Thus for teletext transmissions in the major European languages the coding of the International Standard ISO 646 could be adopted and for each character set it is possible to use a character memory dedicated to that character set. Where a teletext television receiver arrangement is used in a location where it is possible only to reccive teletext transmissions in one language then only the character memory suitable for decoding the coded characters in that language is required. However, where the teletext receiver arrangement is to be used in a location where it possible and desired to receive teletext transmission in different languages there could be employed an appropriate number of character memories corresponding to the number of character sets to be decoded. As many of the characters between the languages are the same the separate character memories could be formed from a single composite character memory capable of having the (eleven) national character options decoded according to the language.

However, the selection of a particular character set, from the options which are available, by means of control bits contained in the page header (Row 0), has the limitation that it is not possible to mix languages on a single page as identified by the page header. Another more serious limitation occurs in connection with a facility proposed for a next generation of teletext decoders which are micro-processor controlled, whereby locally-generated status messages can be displayed under the control of the microprocessor on an additional row either alone or with a displayed page which contains broadcast rows. Such a status message should be in a given language which should not change even though the language of broadcast pages may vary. Thus, this status message facility can require a mixed language page display which cannot be achieved using the control bits in the page header.

SUMMARY OF THE INVENTION

It is an object of the present invention to provide a character generator implementation which overcomes these limitations.

According to the invention a television receiver arrangement of the kind set forth above includes: acquisition means for acquiring teletext information in digitally coded form; memory means for storing the acquired digital codes; and character generator means having a character memory in which is stored character information identifying the available character shapes which the arrangement can display; in which television receiver arrangement the character memory contains character information for a common language set of characters together with a plurality of sets of national option characters any one of which latter sets can be selected by control bits contained in received teletext information to form with the common language set a complete language set for page display in one language; and which television receiver arrangement is characterized in that means are provided for selecting for page display all of the national option character sets, whereby more than one complete language set can be used for the page display.

The invention also provides for teletext page display a method of addressing a character memory in which the stored character information in the form of a common language set of characters and a plurality of sets of national option characters, which method comprises a first addressing mode in which any one of said latter sets can be selected by control bits contained in received teletext information to form with the common language set a complete language set for page display in one language, and a second addressing mode in which all of said latter sets can be selected to form with the common language set a corresponding plurality of complete language sets for page display in more than one language.

BRIEF DESCRIPTION OF THE DRAWINGS

In order that the invention may be more fully understood, reference will now be made by way of example to the accompanying drawings, of which:

FIG. 1 is a block diagram of a television transmission system of the character reference to;

FIG. 2 is a block diagram of a television receiver arrangement of the kind specified;

FIG. 3 is a diagram of a known memory addressing mode format for a character memory; and FIG. 4 is a diagram of a memory addressing format for a character memory in accordance with the invention.

DESCRIPTION OF THE PREFERRED EMBODIMENTS

Figures 1, 2:
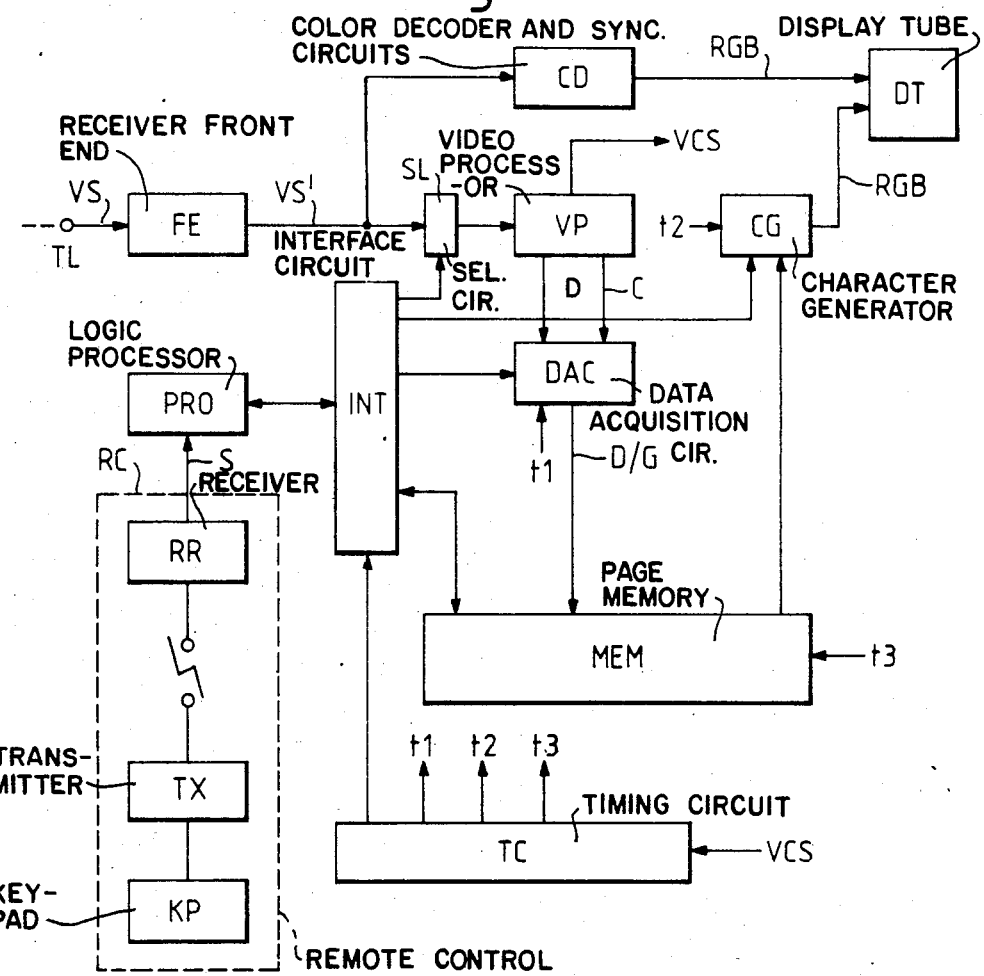

Referring to the drawings, the television transmission system there shown embodies a composite television receiver arrangement for displaying selectively either a television picture which is produced from picture information in a normal over-air broadcast or cable television video signal, or alpha-numeric text or other teletext information which is produced from coded data pulses which are transmitted in the video signal in vertical- or field-blanking intervals thereof. The possibility can also exist for displaying the teletext information concurrently with a television picture, for instance as sub-titles or captions which are superimposed onto the television picture. Furthermore, the system could be adapted for "full-channel" operation, as aforesaid.

As shown generally in FIG. 1, the system comprises a television transmitter TT, and a television receiver arrangement TR which is adapted to receive a television video signal VS via a conventional over-air broadcast or cable transmission link TL. The transmitter TT includes in known manner means for producing television picture information, means for producing alphanumeric text or other teletext information, and further means for generating the television video signal VS containing picture signals representative of the picture information and coded data pulses representative of the teletext information, together with the usual synchronising and equalizing pulses which are necessary for the operation of the television receiver arrangement. The television receiver arrangement TR comprises the usual amplifying, tuning and i.f. detector circuits at its front end, together with video and data processing circuits as will now be considered with reference to FIG. 2.

The composite television receiver arrangement shown in FIG. 2 has its front end FE connected to receive the incoming television video signal VS. For normal picture display in the television receiver arrangement, the demodulated video signal VS′ is applied to a colour decoder which produces the R,G, and B component signals for the picture display. Time base circuits for a display tube DT would receive the usual line and field synchronising pulses from a sync. separator circuit which extracts these synchronising pulses from the video signal VS′. The element CD represents the colour decoder and these other circuit elements which are provided for conventional picture display.

The demodulated video signal VS′ is also applied selectively via a selection dircuit SL to another section of the television receiver arrangement which deals with the display of the alpha-numeric text and other teletext information that is received in digitally coded form. This section comprises a video processor circuit VP which performs inter alia data slicing for retrieving the coded data pulses D from the video signal VS′. The video processor VP also produces regenerated clock pulses C from the data pulses D. The data pulses D are fed together with the clock pulses C to a data acquisition circuit DAC which is operable to feed selected groups D/G of the coded data pulses to a memory MEM as address and display information. The memory MEM has a capacity for storing at least one page of information. A logic processor PRO is operable in accordance with select signals S applied to it from a remote control arrangement RC to control which groups of coded data pulses are acquired by the data acquisition circuit DAC. The arrangement RC has a receiver part RR and a remote transmitter part comprising a transmitter TX and a keypad KP. The processor PRO is further operable to read out from the memory MEM display information for the selected page, for application to a character generator CG which provides R,G,B component signals for the display. A timing circuit TC provides timing signals on connections t1 to t3 for the circuit elements DAC, MEM and CG. These circuit elements and the timing circuit TC are accessed by the processor PRO via an interface circuit INT. The operation of the timing circuit TC is synchronised with the received video signal VS′ by a composite pulse signal VCS which contains the line, field and equalising pulses which are separated from the video signal VS′ in the video processor VP.

In the television receiver arrangement shown in FIG. 2, only single line connections have been shown for the interconnections between the various circuit elements for the sake of simplicity. However, it will be apparent to a person skilled in the art that in practice most of these interconnections would be multi-line. For instance, whereas the coded data pulses D retrieved from the video signal VS′ would be applied serially to the data acquisition circuit DAC over a single connection, serial-to-parallel conversion would take place within this circuit DAC, so that the groups D/G of coded data pulses would be applied to the memory MEM in parallel over a multi-line connection. The connection between the processor PRO and the interface circuit INT can be a so-called $I^2C$ bus (see Mullard Technical Publication M83-0196). The processor PRO can be a commercially available microcomputer; e.g. from the MAB 8400 Series (Philips). Although a composite television receiver arrangement is examplified in FIG. 2, it will be appreciated that the section for data acquisition together with the front end FE may be provided as a separate teletext decoder which is adapted to feed either a television display monitor or a conventional television receiver.

Figure 3:
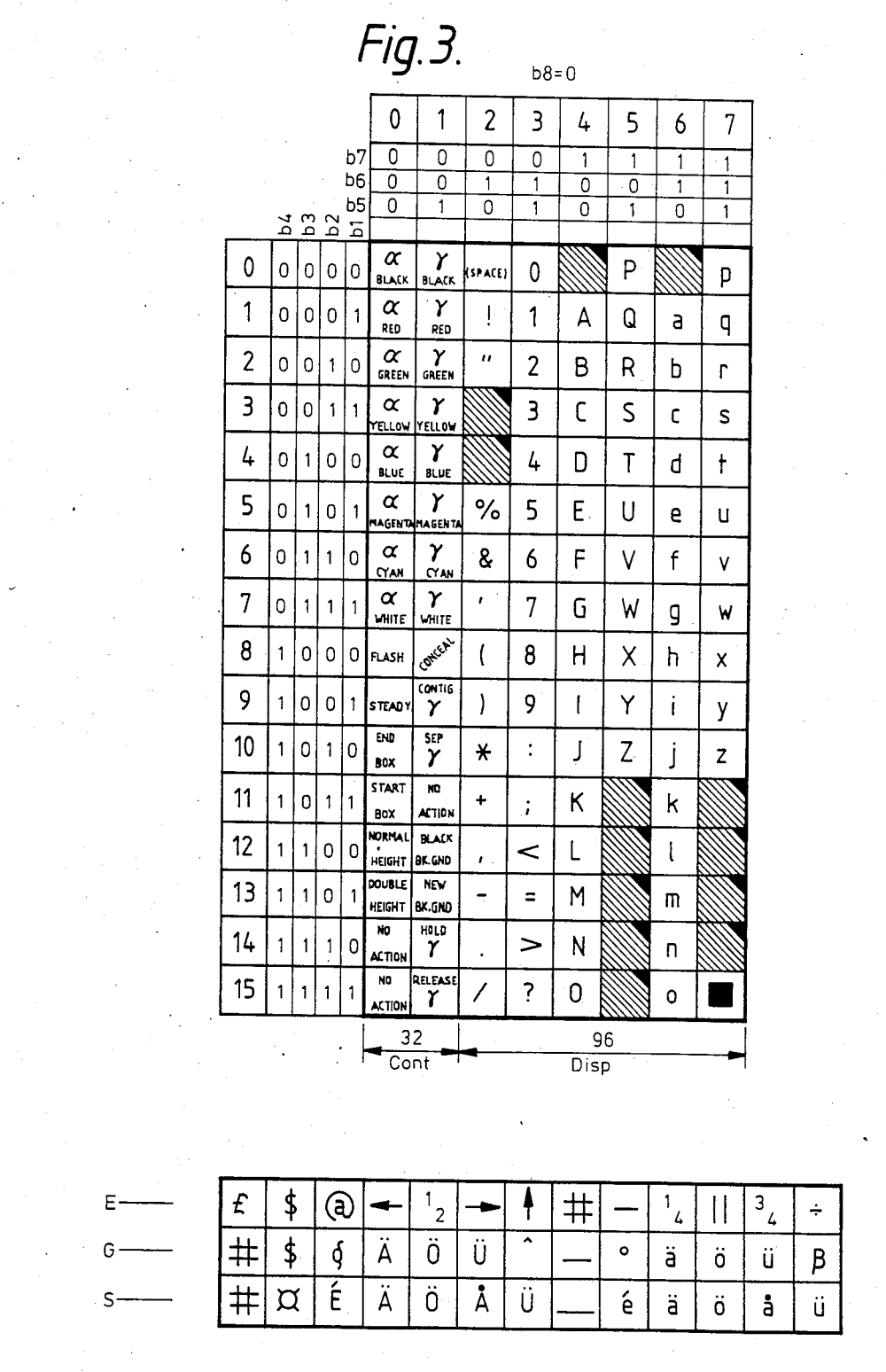

For the performance of the invention, a character memory which forms part of the character generator CG contains character information identifying the available character shapes for display. In one specific implementation of the invention, these character shapes form a common language set and three sets of national option characters, for English, German and Swedish. The character memory is arranged to be addressed in two different modes, as represented by the code tables in FIGS. 3 and 4, respectively. The addressing mode for the code table in FIG. 3 uses 7-bit codes comprising bits b1 to b7 in conventional manner as given in the "Broadcast Teletext Specification" identified previously. There is also an eighth addressing bit b8 which for this addressing mode is set to 0, and which is used as an odd-parity bit in the actual teletext transmission. The 7-bit codes cover 32 control characters Cont as given in the first two columns of the table, and 96 character shapes Disp for display as given in the remaining six columns. (The control characters control the display facilities and are not, of course, actually stored in the character memory). The 96 character shapes consist of a common set of 83 characters and any one of 3 sets E,G,S which each contain 13 national option characters for English, German and Swedish, respectively. A particular one of the 3 sets E,G,S, can be selected in the character generator CG in response to control bits (i.e. C12, C13, C14) transmitted in a page header for an acquired page and stored with the page information in the memory MEM.

When a national option character set is selected, its 13 characters effectively occupy, for addressing purposes, the 13 shaded squares given in the table. The remaining 2 national option character sets remain withdrawn from selection. Thus a page can be displayed in any one of the 3 languages English, German or Swedish as determined by the control bits code combination, but only in that language.

The addressing mode for the code table in FIG. 4 uses an effective 8-bit code by setting b8 to 1. This setting is effected by the processor PRO, for instance in response to appropriate ghost row information contained in an acquired page, or for status message display. The processor PRO reads the ghost row information from the memory MEM (via the interface circuit INT), and in response thereto provides, where necessary, alternative digit codes which are stored in the memory MEM, in place of original digit codes of the acquired page, for addressing the character generator CG. Since the 32 control characters are already provided for in the 7-bit addressing mode for the table in FIG. 3, a further 128 code combinations now become available for addressing the character memory when $b8=1$. As a result, the 83 character shapes of the common language set plus all three sets E,G,S of 13 characters can be addressed individually, which uses $83+39+=122$ of the 128 possible code combinations. A further six shapes are provided for the status row, as shown in the table, to use up the 6 spare code combinations. As a result of this second addressing mode, all 3 national character options are available for display in a single page. Thus, a message generated locally by the processor PRO for the status row can be in a given language irrespective of what language is used for an acquired page. Also, an acquired page can be in more than one language as determined by ghost row information.

What is claimed is:

1. In a television receiver adapted to receive television signals comprising digitally coded data pulses representing teletext information transmitted during television lines in which picture signals representing normal picture information are not present, such television receiver comprising:

acquisition means for acquiring such digitally encoded teletext information, memory means for storing the acquired digital codes, character generator means having a memory in which is stored character information identifying each of the character shapes which the television receiver can display, and a display facility for displaying respective pages of the teletext information; the improvement characterized in that:

said character memory is adapted to store said character information in the form of a common language set of characters together with a plurality of sets of national option characters, any one of such national option character sets being selectively addressable by control bits contained in the received teletext information to form with the common language set a complete language set for displaying a page of the received teletext information in a single language;

said television receiver arrangement further comprising logic processing means responsive to said control bits to address the national option character set in said character memory signified by such control bits; such logic processing means being further adapted to address all of the national option character sets in said character memory, so that more than one of the national option character sets can be used in the display of a single page of the teletext information.

2. A television receiver arrangement as claimed in claim 1, in which the addressing of characters for display of a single complete language set, as comprised by the common language set and a selected one of the national option sets, is effected by said logic processing means by addressing said character memory by a 7-bit code which is obtained by setting the eighth bit of an 8-bit code to 0, said logic processing means being adapted to set said eighth bit to 1 in order to provide additional code combinations for addressing all of the available characters of the common language set and of all of the national option sets.

3. A television receiver arrangement as claimed in claim 2, wherein said logic processing means uses 32 of the code combinations of said 7-bit code to identify respective control characters for controlling the operation of said display facility, 83 code combinations of said 7-bit code for addressing respective characters in said common language set, 13 code combinations of said 7-bit code for addressing respective characters of one of three national option character sets signified by said control bits, and 122 code combinations of said 8-bit code for addressing all of the characters contained in the common language set and all the national option character sets.

4. A television receiver arrangement as claimed in claim 3, characterized in that the remaining 6 code combinations of said 8-bit code are used for addressing symbol characters stored in said character memory which serve as status indications in status messages generated locally by said logic processing means.

5. In a method of teletext page display comprising addressing a character memory in which is stored character information in the form of a common language set of characters and a plurality of sets of national option characters, the improvement characterized in that said method comprises: a first addressing mode in which any one of said sets of national option character sets is selected in accordance with control bits contained in received teletext information so as to form with the common language set a complete language set for page display in one language; and a second addressing mode in which all of said sets of national option character sets are selected so as to form with the common language set a corresponding plurality of complete language sets for page display in more than one language.

* * * * *